(12) United States Patent
Irii et al.

(10) Patent No.: US 6,290,613 B1
(45) Date of Patent: Sep. 18, 2001

(54) GOLF BALL, GOLF BALL COVER MATERIAL COMPOSITION AND METHOD OF MANUFACTURING THE COMPOSITION

(75) Inventors: Daisuke Irii; Yoshihiro Inomata; Nobuo Suzuki; Kazuyuki Kabe; Michihiko Sugiura, all of Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 09/352,347

(22) Filed: Jul. 13, 1999

Related U.S. Application Data (63) Continuation-in-part of application No. 09/135,595, filed on Aug. 18, 1998.

(30) Foreign Application Priority Data

| Aug. 20, 1997 | (JP) | 9-223321 |
| Sep. 4, 1997 | (JP) | 9-239591 |
| Oct. 3, 1997 | (JP) | 9-270955 |
| Oct. 23, 1997 | (JP) | 9-291091 |
| Nov. 6, 1997 | (JP) | 9-303979 |
| Jun. 17, 1998 | (JP) | 10-169705 |
| Jul. 13, 1998 | (JP) | 10-196998 |

(51) Int. Cl.[7] ..................... A63B 37/06
(52) U.S. Cl. ........................ 473/377
(58) Field of Search ............... 473/367, 351, 473/368, 377, 371

(56) References Cited

U.S. PATENT DOCUMENTS

| 5,833,553 | * 11/1998 | Sullivan et al. | 473/374 |
| 5,971,870 | * 10/1999 | Sullivan et al. | 473/373 |
| 5,993,332 | * 11/1999 | Yamagishi et al. | 473/377 |

* cited by examiner

*Primary Examiner*—Mark S. Graham
*Assistant Examiner*—Raeann Gorden
(74) *Attorney, Agent, or Firm*—Finnegan, Henderson, Farabow, Garrett & Dunner, L.L.P.

(57) ABSTRACT

A golf ball whose core is covered with a cover, wherein the core is constituted of a rubber composition containing polybutadiene rubber and the cover is constituted of a resin composition composed of ionomer resin and diene rubber. A golf ball cover material composition composed of ionomer resin, diene rubber and non-staining antioxidant. A method of manufacturing a golf ball cover material composition constituted by mixing/kneading ionomer resin and diene rubber.

16 Claims, 1 Drawing Sheet

GOLF BALL, GOLF BALL COVER MATERIAL COMPOSITION AND METHOD OF MANUFACTURING THE COMPOSITION

RELATED APPLICATIONS

This application is a continuation-in-part of application Ser. No. 09/135,595 filed Aug. 18, 1998.

BACKGROUND OF THE INVENTION

The present invention relates to a golf ball having a superior impact resilience (flying performance) and shot feeling (realize a soft feeling), a golf ball cover material composition capable of obtaining the golf ball having the superior impact resilience and durability and a good appearance, and a method of manufacturing the composition.

There are two types of golf balls: a two piece golf ball in which a core is covered with a cover material; and a multi-layer structure golf ball having three or more layers in which appropriate intermediate layer or layers are placed between the core and the cover.

In a golf ball, a core having a rubber composition is covered by a cover material such as ionomer resin (ionic ethylene copolymer) having superior impact resistance and durability. More particularly, since a two piece golf ball has a longer flight distance and greater durability, it is preferred by most golfers. However, a two piece golf ball is inferior to a thread-wound golf ball in shot feeling and spin performance, because its feeling is harder at the time of a shot.

Golf balls are proposed in the prior art (Japanese Patent Application Laid-open No. 4-109971, No. 5-123422 or the like) which make the shot feeling soft by softening the two piece golf ball like a golf ball that uses a soft core and a soft cover material, or a golf ball in which the hardness of the core is different from that of the cover material or a golf ball in which the thickness of the cover is adjusted and so on. However, although these golf balls are superior in the spin performance and the shot feeling, their flying performance is insufficient.

The impact resilience and shot feeling of the golf ball are also inconsistent with each other, and thus it is desired that a golf ball adapted to appropriately balance these properties is developed. In order to improve the feeling and the spin performance, golf balls have been proposed (Japanese Patent Application Laid-open No. 6-319830) in which the difference in the hardness between the core and the ball is reduced and the hardness of the cover and the thickness of the cover are adjusted. However, although this golf ball is superior in the shot feeling, its impact resilience is insufficient.

On the other hand, in order to make the shot feeling of the golf ball softer, constitution of a golf ball in which the core is covered with the cover material of the ionomer resin and diene rubber has been recently proposed (Japanese Patent Application Laid-open No. 6-79017). However, if the cover material of the ionomer resin and the diene rubber is used, color of the cover changes during or after manufacturing the golf ball, and thus the commercial value of the golf ball is disadvantageously reduced. Furthermore, when the ionomer resin and the diene rubber are kneaded for manufacturing the cover material made of the ionomer resin and the diene rubber, blocking of the diene rubber often occurs before introducing the diene rubber into a screw extruder. When such blocking occurs, it becomes difficult to supply the material of the ionomer resin and the diene rubber to the screw extruder, and, as a result, the productivity is disadvantageously reduced.

SUMMARY OF THE INVENTION

A first object of the present invention is to provide a golf ball wherein both of the impact resilience and shot feeling are improved.

A second object of the present invention is to provide a golf ball cover material composition capable of obtaining a golf ball having superior impact resilience and durability and a good appearance, and a method of manufacturing the composition.

(1) In order to achieve the first object, the present invention provides a golf ball whose core is covered with a cover, wherein a ratio of the flexural rigidity value of the golf ball to the flexural rigidity value of the core is 1.8 or more and less than 3.0 and a thickness of the cover is 1.7 to 2.6 mm.

For a golf ball, an increase in the of hardness of a ball allows the impact resilience to be increased. But on the other hand, the harder ball results in the harder feeling, and consequently the shot feeling becomes worse. On the contrary, although the softer ball makes the shot feeling better, the impact resilience becomes worse and, as a consequence, the ball does not fly longer.

Therefore, according to the present invention, taking into account a balance between the hardness and the softness of the ball, the ratio of flexural rigidity value is determined and the thickness of the cover is determined as described above, whereby both of the impact resilience and the shot feeling can be improved.

(2) In order to achieve the first object, the present invention also provides a golf ball whose core is covered with a cover, wherein a ratio of the compression value of the golf ball to the compression value of the core is 1.2 or more and less than 1.5 and a hardness of the cover is Shore D hardness of 62 or less.

The compression value and the hardness of the cover are determined in this way, and thus the first object can be achieved. Here, the compression value of the golf ball means a compressive strength (kgf) when the golf ball is deformed by 2.54 mm (1/10 inch). Also, the compression value of the core means the compressive strength (kgf) when the core is deformed by 2.54 mm (1/10 inch).

(3) In order to achieve the first object, the present invention further provides a golf ball whose core is covered with a cover, wherein the core is constituted of a rubber composition which is compounded of 100 parts by weight of matrix rubber containing polybutadiene rubber having 40% or more of cis-1,4-structure and 20 to 40 parts by weight of unsaturated carboxylic acid metal salt having an average particle size of 5.0 $\mu$m or less, and the cover is constituted of a resin composition which is composed of ionomer resin and diene rubber dispersed in the ionomer resin and which has Shore D hardness of 65 or less, preferably 62 or less.

Compared to the prior art, the finely-powdered unsaturated carboxylic acid metal salt having average particle size of 5.0 $\mu$m or less is blended with the matrix rubber, whereby it is more finely dispersed in the matrix rubber. In addition, since this unsaturated carboxylic acid metal salt acts as a co-crosslinking agent, it is finely dispersed whereby matrix rubber molecules are more tightly bonded to unsaturated carboxylic acid metal salt molecules, and thus a core composition having proper hardness and superior impact resilience is obtained.

Moreover, since the cover is constituted of the resin composition having Shore D hardness of 65 or less, preferably 62 or less, wherein the diene rubber is dispersed in the ionomer resin, the cover also has the appropriate hardness.

It is thus possible to provide a solid golf ball having superior flying performance, shot feeling and spin performance.

Here, "average particle size" means the particle size measured using a typical particle size analysis (using a centrifugal settlement system).

(4) In order to achieve the second object, a golf ball cover material composition of the present invention is characterized by that the composition has 50 to 90 parts by weight of ionomer resin, 10 to 50 parts by weight of diene rubber and 0.1 to 5 parts by weight of non-staining antioxidant, the diene rubber is dispersed in the ionomer resin, and the dispersed diene rubber has a particle diameter of 5.0 $\mu$m or less. Furthermore, in a method of manufacturing this golf ball cover material composition, 50 to 90 parts by weight of ionomer resin, 10 to 50 parts by weight of diene rubber and 0.1 to 5 parts by weight of non-staining antioxidant are kneaded at a temperature between 130 to 260° C., preferably 150 to 260° C., with the air shut out.

Since this combination of the ionomer resin, the diene rubber and the non-staining antioxidant is used, the second object can be achieved. According to the present invention, since the color of the cover does not change, if a whitening agent such as titanium dioxide is added to the cover material white appearance is not marred even if white paint is not applied to the cover surface. Therefore, only the application of clear paint for protecting the cover is sufficient to paint-surface-finish the golf ball. Thus, the process is easier than the successive application of primer paint, white enamel paint and clear paint like the prior art.

(5) In order to achieve the second object, the present invention provides a method of manufacturing a golf ball cover material composition constituted by kneading ionomer resin and diene rubber and dispersing the diene rubber in the ionomer resin, wherein the ionomer resin and the diene rubber are previously mixed, at a weight ratio (ionomer resin/diene rubber) ranging from 9/1 to 5/5, at such a temperature at which the diene rubber is not crosslinked, and then the resultant mixture is kneaded at such a temperature at which the diene rubber is crosslinked.

In this way, the ionomer resin and the diene rubber are previously mixed at such a temperature at which the two do not crosslink, and then they are kneaded at such a temperature at which they crosslink. That is, two steps are carried out. Thus, since it is possible to prevent an inability to supply the diene rubber to a screw extruder due to the blocking of the diene rubber before kneading, the productivity can be improved. Since this prevention of the blocking also allows the ionomer resin and the diene rubber to be uniformly kneaded, it is possible to obtain a golf ball cover material composition constituting a golf ball having superior impact resilience and durability and good appearance.

In order to achieve the second object, the present invention provides a method of manufacturing a golf ball cover material composition constituted by kneading ionomer resin and diene rubber and dispersing the diene rubber in the ionomer resin, wherein pellets of the diene rubber whose surface are sprinkled with ionomer resin powder is mixed with pellets of the ionomer resin, and then a resultant mixture is kneaded at such a temperature at which the diene rubber is crosslinked.

Since the surface of the pellets of the diene rubber is thus sprinkled with the ionomer resin powder whereby the blocking of the diene rubber can be prevented, and the productivity can be improved. Since this prevention of the blocking also permits the ionomer resin and the diene rubber to be uniformly kneaded, it is possible to obtain a golf ball cover material composition constituting the golf ball having superior impact resilience and durability and good appearance.

In order to achieve the second object, the present invention provides a method of manufacturing a golf ball cover material composition constituted by kneading ionomer resin and diene rubber and dispersing the diene rubber in the ionomer resin, wherein the pellets of the mixture of the ionomer resin powder and the diene rubber is mixed with the pellets of the ionomer resin, and then the resultant mixture is kneaded at such a temperature at which the diene rubber is crosslinked.

In such a manner, the mixture of the ionomer resin powder and the diene rubber is pelletized, and these pellets are then mixed with the pellets of the ionomer resin. Thus, since the blocking of the diene rubber can be prevented, the productivity can be enhanced. Since this prevention of the blocking also enables the ionomer resin and the diene rubber to be uniformly kneaded, it is possible to obtain a golf ball cover material composition constituting a golf ball having superior impact resilience and durability and good appearance.

(6) Also, to attain the first object of the invention above, the present invention consists in a golf ball having a core applied with an outer cover which is characterized in that the cover has a Shore D hardness (A) of 63 or below and the golf ball has a compression value (B), the Shore D hardness (A) of the cover having a ratio to the compression value (B) of the golf ball, (A)/(B), within a range of 0.49 to 0.6.

Attributable to the above definition of the hardness of the cover and the ratio (A)/(B), it is possible to attain the first object of the invention. The compression value of the golf ball termed above refers to the same compressive strength (kgf) when the golf ball is deformed to 2.54 mm ($\frac{1}{10}$ inch) as in the above passage (2). Also, the above termed Shore D hardness refers to a hardness measured according to ASTM D2240 throughout this specification.

BRIEF DESCRIPTION OF THE DRAWINGS

For a more complete understanding of the present invention and the advantages thereof, reference is now made to the following description taken in conjunction with the accompanying drawings, in which.

Figure 1:
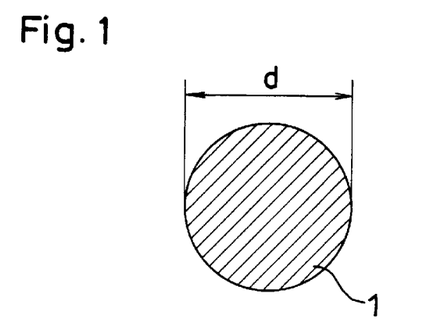
FIG. 1 is a cross sectional view of an example of a core in a golf ball according to the present invention.

DETAILED DESCRIPTION OF THE INVENTION (1) FIG. 1 shows a cross section of a core. In FIG. 1, core 1 is a typical one. For example, the core 1 is constituted by that a compounding ingredient such as crosslinking agent and filler is blended with rubber such as natural rubber, polybutadiene rubber, polyisoprene rubber and styrene-butadiene copolymer rubber. Preferably, cis-1,4-polybutadiene rubber having at least 40% or more of cis-structure is used as the rubber. Furthermore, 20 to 40 parts by weight of unsaturated carboxylic acid metal salt having an average particle size of 5.0 $\mu$m or less or preferably 2.0 to 3.5 μm, and for example, zinc diacrylate form 20 to 40 parts by weight is blended with 100 parts by weight of the above-described rubbers, whereby the core is obtained. This obtained core is preferably used. In FIG. 1, d denotes the diameter of the core 1.

Figure 2:
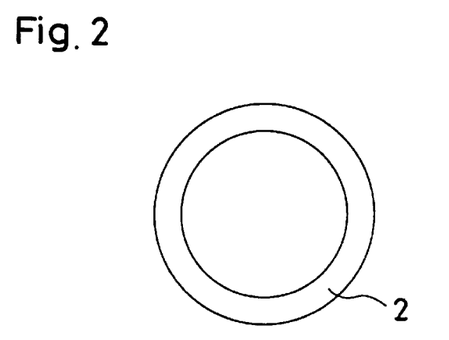
FIG. 2 is a cross sectional view of an example of a cover in the golf ball according to the present invention.
Figure 3:
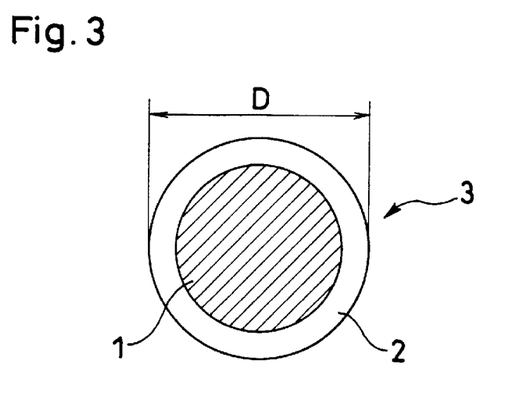
FIG. 3 is a cross sectional view of an example of the golf ball in which a core is covered with a cover according to the present invention.

The core 1 is covered with a cover 2 as shown in FIG. 2, whereby a golf ball 3 shown in FIG. 3 can be obtained. In FIG. 3, D denotes the diameter of the golf ball 3.

In general, the cover 2 comprises ionomer resin having a superior impact resistance and impact resilience. In the ionomer resin, ethylene-unsaturated carboxylic acid copolymer is used as base resin. For example, the ionomer resin is obtained from ethylene-unsaturated carboxylic acid copolymer and a metallic compound capable of supplying cation. For example, the ethylene-unsaturated carboxylic acid copolymer is the copolymer of ethylene and unsaturated carboxylic acid having 3 to 6 carbon valences such as acrylic acid, methacrylic acid, maleic acid, fumaric acid or vinyl benzoate. The metallic compound capable of supplying the cation is, for example, formate, acetate, nitrate, carbonate, hydrogencarbonate, oxide, hydroxide, alcoxide or the like such as alkali metal, alkali earth metal and transition metal. The types of the metals are Na, Zn, Li, Mg, Mn, Ca, Co, K and so on. This ionomer resin is, for example, the metal salt of the copolymer of ethylene and methacrylic acid. Commercially available ionomer resin may be used, for example, Himilan 1605, Himilan 1652, Himilan 1706, Himilan 1707, Himilan 1855, Himilan 1856, Himilan AM7315, Himilan AM7316, Himilan AM7317, Himilan AM7318 manufactured by Du pont-Mitsui Polychemical Co., Ltd., Surlyn 7930, Surlyn 7940, Surlyn 8120, Surlyn 8320 manufactured by I. du Pont de Nemours and Company (the Du Pont Company) or the like.

Preferably, the cover 2 is composed of a composition, containing 50 to 90 parts by weight of the ionomer resin of Shore D hardness of 55 or more and less than 80 and 10 to 50 parts by weight of the diene rubber, in which the diene rubber is dispersed in the ionomer resin in such a manner that it has a particle diameter of 5 μm or less.

For example, butadiene rubber, natural rubber, isoprene rubber, ethylene-propylene-diene rubber, acrylonitrile-butadiene rubber, styrene-butadiene rubber or the like may be used as the diene rubber. Preferably, the butadiene rubber of these rubbers is used. Although the commercially available product may be used as the butadiene rubber, the one having the cis-1,4-structure of 40% or more is preferably used.

In this composition, the diene rubber is dispersed in the ionomer resin in such a manner that the particle diameter thereof is 5 μm or less. Preferably, the particle diameter is 0.1 to 5 μm. By using the particle diameter as fine as 5 μm or less, excellent impact resilience, durability and good appearance can be obtained. Preferably, the diene rubber is thermally crosslinked in this composition. Here, a thermal crosslinking means the crosslinking of a non-crosslinked diene rubber by heat alone without the use of crosslinking agent (the crosslinking takes place by only the heating). When the diene rubber is not thermally crosslinked, the impact resilience, durability and appearance of the cover are deteriorated. Here, the deterioration of the appearance means the fluffing of the cover that results in a worse appearance.

If the diene rubber is crosslinked by the use of organic peroxide as the crosslinking agent, the ionomer resin is also simultaneously crosslinked. For this reason, the flow properties of a cover material composition composed of the ionomer resin and the diene rubber deteriorates considerably, which makes molding impossible. If the diene rubber is crosslinked by the use of sulfur vulcanizing agent, the cover material composition is colored in yellow and thus the commercial value is disadvantageously reduced. On the contrary, when the diene rubber is crosslinked by only the heat without the use of the crosslinking agent, these problems do not occur. More specifically, the crosslinking by only the heat improves in the impact resilience as compared to the crosslinking by the sulfur vulcanizing agent.

According to the present invention, in the golf ball 3 in which the core 1 is covered with the cover 2 in this way, a ratio of the flexural rigidity value of the golf ball to the flexural rigidity value of the core is set to 1.8 or more and less than 3.0. If this ratio is less than 1.8, the impact resilience of the golf ball becomes worse. On the other hand, if this ratio is 3.0 or more, the golf ball becomes too hard and the shot feeling becomes worse.

Here, the ratio of the flexural rigidity value of the golf ball to the flexural rigidity value of the core (hereinafter, referred to as a flexural rigidity ratio m) is represented by $m=(EI)/(E_1 I_1)$ as shown in Table 1.

TABLE 1

|  | Core | Cover | Ball |
| --- | --- | --- | --- |
| Diameter (mm) | d | — | D |
| Young's modulus of elasticity (MPa) | $E_1$ | $E_2$ | — |
| flexural rigidity ($Nm^2$) | $E_1 I_1$ | $E_2 I_2$ | EI |

Notes)
$E_1 I_1 = E_1 \times \pi d^4/64$
$E_2 I_2 = E_2 \times \pi(D^4 - d^4)/64$
Ball flexural rigidity = (core flexural rigidity) + (cover flexural rigidity)
$EI = E_1 I_1 + E_2 I_2$
Flexural rigidity ratio $m = (EI)/(E_1 I_1)$ Where, $I, I_1, I_2$, are cross section two-dimensional momentum.

Young's modulus of elasticity $E_2$ of the cover may be 100 to 200 MPa. In the present invention the thickness of the cover is set to 1.7 to 2.6 mm. If the cover thickness is less than 1.7 mm, the cover becomes too thin and the impact resilience of the golf ball becomes worse. On the other hand, if the thickness exceeds 2.6 mm, the golf ball becomes too hard and the shot feeling becomes worse. The diameter d of the core may be 37.5 to 39.3 mm. Although the golf ball of the present invention may be of a typical size and weight, the ball preferably has the diameter D of 42.67 mm or more and the weight of 45.93 g or less.

The golf ball of the present invention can be applied not only to a two piece golf ball of two layers as shown in FIG. 3 but also to a golf ball such as a three piece golf ball having a multi-layer structure of three or more layers. Moreover, the material of the core and the cover, the manufacturing method and the like are not limited. Examples, comparison examples:

A spherical solid core was covered with a cover so as to manufacture two piece golf ball of a diameter of 42.7 mm and a two layer structure having elements shown in Tables 2, 3 and 4 (examples 1 to 7, comparison examples 1 to 5). The impact resilience and shot feeling of this golf ball is shown in the lower rows in Tables 2, 3 and 4.

In examples 1–3, 6, 7 and comparison examples 1, 2, 5, a typical composition of the spherical solid core is as follows. 100 parts by weight of polybutadiene rubber (BR-01 available from JSR Corporation) containing 97% of cis-1,4-structure was blended with 30 parts by weight of zinc diacrylate of a particle diameter of 2.5 μm, 19 parts by weight of barium sulfate, 5 parts by weight of zinc oxide, peroxide and antioxidant, whereby the composition was obtained. Then, the obtained composition was thermally crosslinked at 160° C. for twenty minutes and press-molded to obtain a spherical core.

Here, in examples 1 to 5 and comparison examples 1 to 5, the composition was composed of ethylene /methacrylic acid copolymer ionomer resin and ethylene/methacrylic acid/(meth) acrylate terpolymer ionomer resin. By changing the blend ratio, Young's modulus of elasticity was varied. Such a composition was used as the cover material.

In examples 6 and 7, the composition was composed of ethylene/methacrylic acid copolymer ionomer resin and butadiene rubber. By changing the blend ratio, Young's modulus of elasticity was varied. Such a composition was used as the cover material In this composition, the butadiene rubber is dispersed in such a manner that the particle diameter thereof is 5 μm or less.

TABLE 2

|  | Example 1 | Example 2 | Example 3 | Example 4 | Example 5 |
|---|---|---|---|---|---|
| Cover Young's modulus of elasticity*1 | 200 | 150 | 100 | 150 | 150 |
| Cover thickness (mm) | 2.2 | 2.2 | 2.2 | 1.8 | 2.5 |
| Core flexural rigidity $E_1I_1$*2 | 7.39 | 7.39 | 7.39 | 8.03 | 6.94 |
| Ball flexural rigidity EI*3 | 18.90 | 16.02 | 13.14 | 15.25 | 15.96 |
| Flexural rigidity ratio m*4 | 2.6 | 2.2 | 1.8 | 1.9 | 2.3 |
| Index of impact resilience*5 | 101.4 | 101.2 | 100.8 | 100.7 | 101.0 |
| Shot feeling*6 | Good | Good | Good | Good | Good |

TABLE 3

|  | Comparison 1 | Comparison 2 | Comparison 3 | Comparison 4 | Comparison 5 |
|---|---|---|---|---|---|
| Cover Young's modulus of elasticity*1 | 90 | 50 | 100 | 200 | 300 |
| Cover thickness (mm) | 2.2 | 2.2 | 1.5 | 2.9 | 2.2 |
| Core flexural rigidity $E_1I_1$*2 | 7.39 | 7.39 | 8.53 | 6.37 | 7.39 |
| Ball flexural rigidity EI*3 | 12.57 | 10.27 | 12.79 | 21.02 | 29.56 |
| Flexural rigidity ratio m*4 | 1.7 | 1.4 | 1.5 | 3.3 | 4.0 |
| Index of impact resilience*5 | 100.0 | 98.7 | 99.0 | 101.6 | 102.0 |
| Shot feeling*6 | Good | Some what soft | Good | Hard | Hard |

TABLE 4

|  | Example 6 | Example 7 |
|---|---|---|
| Cover Young's modulus of elasticity*1 | 200 | 150 |
| Cover thickness (mm) | 2.2 | 2.2 |
| Core flexural rigidity $E_1I_1$*2 | 7.39 | 7.39 |
| Ball flexural rigidity EI*3 | 18.90 | 16.02 |
| Flexural rigidity ratio m*4 | 2.6 | 2.2 |
| Index of impact resilience*5 | 101.7 | 101.5 |
| Shot feeling*6 | Good | Good |

In Table 3, the flexural rigidity ratio m of the comparison examples 1 and 2 is lower than that of the present invention. Both of the flexural rigidity ratio m and the cover thickness of the comparison example 3 are respectively lower and smaller than those of the present invention. Both of the flexural rigidity ratio m and the cover thickness of the comparison example 4 are respectively higher and larger than those of the present invention. The flexural rigidity ratio m of the comparison example 5 is higher than that of the present invention.

As can be seen from Tables 2 and 3, examples 1 to 5 of the golf ball of the present invention are superior to the golf balls of the comparison examples 1 to 5 in both of the impact resilience and the shot feeling.

In Table 4, there are shown examples 6 and 7. In these examples, the following composition is used as the cover material. That is, in this composition, the diene rubber i.e. the butadiene rubber is dispersed in ionomer resin in such a manner that it has the particle diameter of 5 μm or less. In this manner, because of the use of the composition in which the butadiene rubber is dispersed, the impact resilience of examples 6 and 7 are still better than that of examples 1 to 5.

As described above, according to the present invention, in the golf ball whose core is covered with the cover, since the ratio of the flexural rigidity value of the golf ball to the flexural rigidity value of the core is 1.8 or more and less than 3.0 and, the cover thickness is 1.7 to 2.6 mm, both of the impact resilience and the shot feeling can be improved. For example, for a driver shot, the impact resilience is superior and the shot feeling is also better.

(2) In the present invention, the ratio of the compression value of the golf ball to the compression value of the core is set to 1.2 or more and less than 1.5. This ratio is set for the following reason. If the ratio is less than 1.2, the impact resilience of the golf ball becomes worse. On the other hand, if the ratio is 1.5 or more, the golf ball becomes too hard and thus the shot feeling becomes worse.

Moreover, the hardness of the cover of the golf ball is Shore D hardness of 62 or less, or preferably Shore D hardness should be 45 to 62. If the hardness exceeds Shore D hardness of 62, the cover becomes too hard and consequently the spin performance becomes worse.

This cover may be composed of the composition, containing 50 to 90 parts by weight of the ionomer resin of Shore D hardness of 55 or more and less than 80 and 10 to 50 parts by weight of the diene rubber, in which the diene rubber is dispersed in the ionomer resin in such a manner that it has the particle diameter of 5 μm or less.

This ionomer resin has Shore D hardness equal to or more than 55 and less than 80 (55≦Shore D hardness<80). Shore D hardness is set to 55 or more, because the harder ionomer resin has the higher impact resilience. If Shore D hardness is 80 or more, even the mixing of the diene rubber in the ionomer resin has no effect and, as a result, the shot feeling of the obtained golf ball is too hard.

The above-described composition constituting the cover is composed of 50 to 90 parts by weight of the ionomer resin and 10 to 50 parts by weight of the diene rubber. If the content of the ionomer resin is below 50 parts by weight, the hardness of the cover is reduced and thus the shot feeling becomes too soft. On the other hand, if the content of the ionomer resin is over 90 parts by weight, the softening by the diene rubber is insufficient and thus the shot feeling becomes too hard.

In this composition, the diene rubber is dispersed in the ionomer resin in such a manner that it has the particle diameter of 5 $\mu$m or less. Preferably, the particle diameter is 0.1 to 5 $\mu$m. The reason is that the particle diameter is as fine as 5 $\mu$m or less so as to thereby obtain good impact resilience, durability and appearance. Preferably, the diene rubber is thermally crosslinked in this composition.

For manufacturing the above-mentioned composition constituting the cover, at a ratio of viscosity of the ionomer resin at a kneading temperature of the ionomer resin to viscosity of the diene rubber at the same temperature (the diene rubber/the ionomer resin) ranging from 1/1 to 5/1, 50 to 90 parts by weight of the ionomer resin is mixed with 10 to 50 parts by weight of the diene rubber at the kneading temperature of the ionomer resin (130 to 260° C.). Thereby, the diene rubber can be dispersed in the ionomer resin in such a manner that it has the particle diameter of 5 $\mu$m or less.

If the viscosity ratio is higher than 5/1, difference in viscosity between the ionomer resin and the diene rubber is larger. As a result, since a shearing force is not applied during the kneading, the diene rubber is not finely dispersed. On the other hand, if the viscosity ratio is lower than 1/1, the viscosity of the ionomer resin is higher than that of the diene rubber. As a consequence, since the composition is structured so that the ionomer resin is finely dispersed in the diene rubber in a converse manner, the ionomer resin and the diene rubber cannot be mixed. Preferably, the kneading is carried out at a shear rate of 1000/sec or more. If the shear rate is less than 1000/sec, the diene rubber cannot have the particle diameter of 5 $\mu$m or less. Preferably, a twin-screw extruder is used as a mixer for use in this kneading.

EXAMPLES

Comparison Examples

A core material shown in Table 8 was used so as to prepare a spherical solid core having a diameter of 38.3 mm and a cover material shown in Table 7 was used so as to cover this solid core with a cover of 2.5 mm thick, whereby two piece golf balls of two layer structure having a cover hardness and a compression ratio shown in Tables 5 and 6 were manufactured (examples 8 to 13, comparison examples 6 to 9). Physical properties of these golf balls are shown in the lower rows in Tables 5 and 6.

TABLE 5

| | Examples | | | | | |
|---|---|---|---|---|---|---|
| | 8 | 9 | 10 | 11 | 12 | 13 |
| Cover material | A-1 | A-2 | A-3 | A-2 | A-2 | A-4 |
| Cover hardness*[1] | 60 | 56 | 52 | 56 | 56 | 55 |
| Core material | B-1 | B-1 | B-1 | B-2 | B-3 | B-1 |
| Core compression C*[2] | 85 | 85 | 85 | 95 | 75 | 85 |

TABLE 5-continued

| | Examples | | | | | |
|---|---|---|---|---|---|---|
| | 8 | 9 | 10 | 11 | 12 | 13 |
| Ball compression D*[3] | 123 | 115 | 106 | 125 | 103 | 110 |
| D/C*[4] | 1.45 | 1.35 | 1.25 | 1.32 | 1.37 | 1.29 |
| Index of impact resilience*[5] | 101.4 | 101.2 | 100.8 | 101.3 | 101.0 | 100.5 |
| Index of spin rate*[6] | 99.8 | 111.5 | 124.7 | 115.2 | 105.0 | 111.8 |
| Shot feeling**[7] | Good | Good | Good | Good | Good | Good |

TABLE 6

| | Comparison examples | | | |
|---|---|---|---|---|
| | 6 | 7 | 8 | 9 |
| Cover material | A-5 | A-6 | A-7 | A-8 |
| Cover hardness*[1] | 59 | 55 | 52 | 67 |
| Core material | B-1 | B-1 | B-1 | B-4 |
| Core compression C*[2] | 85 | 85 | 85 | 60 |
| Ball compression D*[3] | 98 | 94 | 92 | 100 |
| D/C*[4] | 1.15 | 1.11 | 1.08 | 1.67 |
| Index of impact resilience*[5] | 100.0 | 99.4 | 98.7 | 101.2 |
| Index of spin rate*[6] | 100.0 | 111.8 | 123.5 | 82.4 |
| Shot feeling**[7] | Good | Good | Good | Somewhat hard |

TABLE 7

| Cover | A-1 | A-2 | A-3 | A-4 | A-5 | A-6 | A-7 | A-8 |
|---|---|---|---|---|---|---|---|---|
| H1605*[8] | 45 | 40 | 35 | 30 | 20 | 15 | 10 | 50 |
| H1706*[9] | 45 | 40 | 35 | 30 | 20 | 15 | 10 | 50 |
| SA420*[10] | | | | 35 | | | | |
| IM203*[11] | | | | 5 | | | | |
| S8120*[12] | | | | | 60 | 70 | 80 | |
| Nipol1220L*[13] | 10 | 20 | 30 | | | | | |
| TiO$_2$ | 1 | 1 | 1 | 1 | 1 | 1 | 1 | 1 |
| Hardness | 60 | 56 | 52 | 55 | 59 | 55 | 52 | 67 |

TABLE 8

| Core | B-1 | B-2 | B-3 | B-4 |
|---|---|---|---|---|
| JSR BR01*[14] | 100 | 100 | 100 | 100 |
| Zn (AA)$_2$*[15] | 29 | 31 | 27 | 24 |
| ZnO | 19.7 | 18.8 | 20.6 | 22.0 |
| Peroxide*[16] | 3 | 3 | 3 | 3 |
| Antioxidant*[17] | 0.5 | 0.5 | 0.5 | 0.5 |
| Compression | 85 | 95 | 75 | 60 |

Notes)
*[1] A 2-mm-thick injection-molded resin plate was cured at 23° C. for twenty days, three resin plates were then stacked and measured at 23° C. by the use of a Shore D durometer.
*[2] A compressive strength (kgf) when the core is deformed by 2.54 mm (1/10 inch).
*[3] A compressive strength (kgf) when the ball is deformed by 2.54 mm (1/10 inch).
*[4] A ratio of ball compression value to core compression value.
*[5] A relative value to comparison example 6 that is assumed as 100, indicating the ratio of the initial speed of the golf ball to the head speed when the swing robot was used so as to shoot the golf ball at a head speed of 43 m/sec by the driver (wood #1).
*[6] A relative value to comparison example 6 that is assumed as 100, indicating a rate of back spin (rpm) when the golf ball is shot at a head speed of 33 m/sec by a pitching wedge.
*[7] The shot feeling when a professional golfer shoots the golf ball by the driver (wood club #1).
*[8] Sodium salt of ethylene-methacrylic acid copolymer, Du pont-Mitsui Polychemical Co., Ltd., Shore D hardness: 67.
*[9] Zinc salt of ethylene-methacrylic acid copolymer, Du pont-Mitsui Polychemical Co., Ltd., Shore D hardness: 66.

TABLE 8-continued

| Core | B-1 | B-2 | B-3 | B-4 |
| --- | --- | --- | --- | --- |

*[10]Ethylene-ethylacrylate copolymer sodium ionic saponifiable resin, Du pont-Mitsui Polychemical Co., Ltd., Shore D hardness: 28.
*[11]Core shell polymer (containing epoxy group), Takeda Chemical Industry Incorporation Ltd.
*[12]Sodium salt of ethylene-methacrylic acid-methacrylate terpolymer, I. du Pont de Nemours and Company (the DuPont Company), Shore D hardness: 47.
*[13]Polybutadiene rubber, Nippon Zeon Co., Ltd., containing 97% of 1,4-cis-structure, Mooney viscosity: 43.
*[14]Polybutadiene rubber, JSR Corporation, containing 97% of 1,4-cis-structure, Mooney viscosity: 42.
*[15]Zinc diacrylate.
*[16]Dicumyl peroxide.
*[17]Irganox 1010.

As can be seen from Tables 5 and 6, examples 8 to 13 of the golf ball of the present invention are superior to comparison examples 6 to 8 equivalent to the conventional two piece golf ball in the shot feeling, the impact resilience (flying performance) and the spin performance. In comparison example 9 in which the cover hardness is too high and too a large value (D/C) is deduced by diving the ball compression value by the core compression value, the shot feeling is not good and the impact resilience is excellent, but the spin performance is inferior.

As described above, according to the present invention, in the golf ball whose core is covered with the cover, since the ratio of golf ball compression value to core compression value is 1.2 or more and less than 1.5 and the cover hardness is Shore D hardness of 62 or less, it is possible to provide the solid golf ball having superior flying performance (impact resilience), shot feeling and spin performance. For instance, the impact resilience is superior for the driver shot, back spin is easily given to the ball for an iron shot and the shot feeling is also good.

(3) Moreover, in the golf ball of the present invention, the core is constituted of a rubber composition which is compounded of 100 parts by weight of matrix rubber containing polybutadiene rubber having 40% or more of cis-1,4-structure and 20 to 40 parts by weight of unsaturated carboxylic acid metal salt having an average particle size of 5.0 μm or less. The cover is also constituted of a resin composition which contains ionomer resin and diene rubber dispersed in the ionomer resin and which has Shore D hardness of 65 or less, preferably 62 or less.

The rubber composition constituting the core is composed of the matrix rubber and the unsaturated carboxylic acid metal salt. The matrix rubber is the rubber containing the polybutadiene rubber having at least 40% or more of cis-1, 4-structure or preferably 90% or more thereof. The reason for this composition is that good impact resilience cannot be maintained if the content of cis-1,4-structure is less than 40%.

Preferably, the aforementioned polybutadiene rubber is used as this matrix rubber singly. But, if necessary, a rubber component conventionally used as the matrix rubber for the solid golf ball, such as natural rubber, polyisoprene rubber and styrene-butadiene copolymer rubber may be appropriately blended with the matrix rubber.

Various carboxylic acid having unsaturated bond is used as unsaturated carboxylic acid in the unsaturated carboxylic acid metal salt. α, β-unsaturated carboxylic acid such as acrylic acid, methacrylic acid, maleic acid and fumaric acid is more preferable. Acrylic acid and/or methacrylic acid are/is most preferable.

The type of the metal of the metal salt is the one containing metal ion having 1 to 3 valences, for example, zinc, sodium, magnesium, calcium, aluminum or the like, and zinc is particularly preferable. Accordingly, zinc diacrylate and/or zinc dimethacrylate is preferably used as the unsaturated carboxylic acid metal salt.

The average particle size of this unsaturated carboxylic acid metal salt is 5.0 μm or less or preferably 2.0 to 3.5 μm. If the average particle size is less than 2.0 μm, the particles are too fine and thus many particles are scattered during kneading, which results in bad processability. On the contrary, if the average particle size exceeds 5.0 μm, agglomerates are easily formed in the rubber, dispersion properties become worse and the properties of the obtained golf ball also deteriorate.

The core is constituted by blending 20 to 40 parts by weight of the unsaturated carboxylic acid metal salt with 100 parts by weight of the matrix rubber. Otherwise, there are drawbacks as described below. That is, if the content of the unsaturated carboxylic acid metal salt is less than 20 parts by weight, the hardness of the ball is insufficient. If the content is more than 40 parts by weight, the ball hardness is too high and thus the feeling becomes worse at the time of the shot.

More preferably, 10 to 30 parts by weight of barium sulfate are further blended with 100 parts by weight of the matrix rubber. 10 or more parts by weight of barium sulfate can facilitate kneading processability of zinc diacrylate. Since the barium sulfate also acts as inert filler so as to function as core weight adjuster, the upper limit of the blend ratio is not particularly restricted but can be changed depending on other components, a core size or the like. However, it is typically preferable that 10 to 30 parts by weight of barium sulfate are blended with 100 parts by weight of the rubber.

The generally available products may be used as the barium sulfate. Preferably, the average particle size thereof is 5 to 10 μm. The barium sulfate acts as the inert filler and also has a low friction coefficient. Therefore, the barium sulfate is previously mixed into the rubber, whereby the charge due to the friction between the rubber and zinc diacrylate or between one zinc diacrylate and another zinc diacrylate is reduced and, as a result, the kneading processability of zinc diacrylate is improved. Moreover, since the dispersion properties of the obtained rubber composition are improved and the core properties are also good, the barium sulfate acts as processing aid and dispersing agent for zinc diacrylate.

Organic peroxide, filler, antioxidant or the like is typically used as the other compounding ingredients. Organic peroxide is dicumyl peroxide, for example. Zinc oxide or the like is used as the crosslinking agent. If necessary, the other compounding ingredients can be also appropriately blended. 1 to 5 parts by weight of organic peroxide is blended with 100 parts by weight of the matrix rubber. 3 to 10 parts by weight of zinc oxide is blended with 100 parts by weight of the matrix rubber.

The resin composition constituting the cover contains the ionomer resin and the diene rubber dispersed in the ionomer resin and has Shore D hardness of 65 or less.

Preferably, the ionomer resin has Shore D hardness equal to or more than 55 and less than 80 (55≦Shore D hardness<80). Shore D hardness is set to 55 or more, because the harder ionomer resin has higher impact resilience. If Shore D hardness is 80 or more, even the mixing of the diene rubber in the ionomer resin has no effect and, as a result, the shot feeling of the obtained golf ball is too hard.

Preferably, the resin composition constituting the cover is composed of 50 to 90 parts by weight of the ionomer resin and 10 to 50 parts by weight of the diene rubber. If the content of the ionomer resin is less than 50 parts by weight, the hardness of the cover is reduced and thus the shot feeling becomes too soft. On the other hand, if the content of the ionomer resin exceeds 90 parts by weight, the softening by the diene rubber is insufficient and thus the shot feeling becomes too hard.

In this resin composition, the thermally crosslinked diene rubber may be dispersed in the ionomer resin. The particle diameter of the diene rubber dispersed in the ionomer resin is 5 μm or less, or preferably 0.1 to 5 μm. By using the particle diameter as fine as 5 μm or less, good impact resilience, durability and appearance can be obtained.

Moreover, this resin composition may be such that tan δ is 0.07 or less or preferably 0.01–0.07 at 0° C. By setting tan δ to 0.07 or less at 0° C., impact resilience of the golf ball can be further improved, tan δ can be set to 0.07 or less at 0° C. by using the ionomer resin of the high hardness and using the diene rubber of a low glass transition temperature (Tg), for example.

For manufacturing the cover, the ionomer resin and the non-crosslinked diene rubber are kneaded at the temperature of 150° C. or more and less than 260° C. , and the diene rubber is thermally crosslinked and dispersed in the ionomer resin. In this case, preferably, the ionomer resin and the diene rubber are kneaded by stirring them in the mixer at the shear rate of 1000/sec or more. This stirring allows the diene rubber to be excellently dispersed in the ionomer resin and also enables the particle diameter of the dispersed diene rubber to be as fine as 5 μm or less. Accordingly, good impact resilience, durability and appearance of the cover material is obtained.

If the kneading temperature is less than 150° C., the temperature is too low and thus the diene rubber is not thermally crosslinked, which results in the worse impact resilience, durability and appearance. If the kneading is carried out at 260° C. or more, the diene rubber deteriorates due to the heat and, as a result, impact resilience, durability and appearance become worse.

Any other rubber, elastomer, filler, pigment, processing aid material and stabilizer may be appropriately added to this resin composition.

The hardness of the thus obtained resin composition is Shore D hardness of 65 or less, preferably 62 or less. Therefore, Shore D hardness of the cover constituted of this resin composition is 65 or less, or preferably 45 to 62.

EXAMPLES

Comparison Examples

In accordance with a formulation (represented by parts by weight) shown in Table 9, the core compositions (rubber compositions) and the cover compositions (resin compositions) were prepared (examples 14 to 20, comparison examples 10 to 15).

Obtained core compositions were press-molded at 160° C. for twenty minutes, so that a spherical solid core of 38.3 mm diameter was formed. This solid core was covered with the obtained cover composition of 2.5 mm thick by injection molding, whereby two piece golf balls of two layer structure were manufactured. Physical properties of these golf balls are shown in the lower rows in Table 9.

TABLE 9

| | Examples | | | | | | | Comparison examples | | | | | |
|---|---|---|---|---|---|---|---|---|---|---|---|---|---|
| | 14 | 15 | 16 | 17 | 18 | 19 | 20 | 10 | 11 | 12 | 13 | 14 | 15 |
| Core composition | | | | | | | | | | | | | |
| BR-01[*1] | 100.00 | 100.00 | 100.00 | 100.00 | 100.00 | 100.00 | 100.00 | 100.00 | 100.00 | 100.00 | 100.00 | 100.00 | 100.00 |
| Barium sulfate | 19.00 | 21.00 | 19.00 | 16.00 | 19.00 | 19.00 | 19.00 | | | 19.00 | 19.00 | 23.00 | 12.00 |
| Zinc oxide | 5.00 | 5.00 | 5.00 | 5.00 | 5.00 | 5.00 | 5.00 | 18.00 | 18.00 | 5.00 | 5.00 | 5.00 | 5.00 |
| Zinc diacrylate (A)[*2] | 30.00 | | | | | | | | | | | | |
| Zinc diacrylate (B)[*3] | | 20.00 | 30.00 | 40.00 | | 30.00 | 30.00 | | | 30.00 | 30.00 | 10.00 | 50.00 |
| Zinc diacrylate (C)[*4] | | | | | 30.00 | | | | | | | | |
| Zinc diacrylate (D)[*5] | | | | | | | | 30.00 | 30.00 | | | | |
| Antioxidant[*6] | 0.50 | 0.50 | 0.50 | 0.50 | 0.50 | 0.50 | 0.50 | 0.50 | 0.50 | 0.50 | 0.50 | 0.50 | 0.50 |
| Dicumyl peroxide | 1.50 | 1.50 | 1.50 | 1.50 | 1.50 | 1.50 | 1.50 | 1.50 | 1.50 | 1.50 | 1.50 | 1.50 | 1.50 |
| Core properties | | | | | | | | | | | | | |
| Index of impact resilience[*7] | 102.2 | 102.0 | 102.5 | 102.8 | 102.0 | 102.5 | 102.5 | 100.0 | 100.0 | 102.5 | 102.5 | 99.5 | 103.0 |
| Hardness (JIS C) | 78 | 67 | 76 | 80 | 73 | 76 | 76 | 66 | 66 | 76 | 76 | 60 | 90 |
| Compression[*8] | 81 | 70 | 78 | 83 | 75 | 78 | 78 | 68 | 68 | 78 | 78 | 45 | 103 |
| Cover composition | | | | | | | | | | | | | |
| H1605[*9] | 40.00 | 45.00 | 40.00 | 35.00 | 40.00 | 45.00 | 35.00 | 50.00 | 45.00 | 10.00 | 50.00 | 45.00 | 35.00 |
| H1706[*10] | 40.00 | 45.00 | 40.00 | 35.00 | 40.00 | 45.00 | 35.00 | 50.00 | 45.00 | 10.00 | 50.00 | 45.00 | 35.00 |
| BR-01[*1] | 20.00 | 10.00 | 20.00 | 30.00 | 20.00 | 10.00 | 30.00 | | 10.00 | | | 10.00 | 30.00 |
| S8120[*11] | | | | | | | | | | 80.00 | | | |
| TiO2 | 1.00 | 1.00 | 1.00 | 1.00 | 1.00 | 1.00 | 1.00 | 1.00 | 1.00 | 1.00 | 1.00 | 1.00 | 1.00 |
| Cover hardness (Shore D) | 56 | 62 | 56 | 52 | 56 | 62 | 52 | 67 | 62 | 62 | 67 | 62 | 52 |
| Ball properties | | | | | | | | | | | | | |
| Index of impact resilience[*12] | 100.8 | 101.0 | 101.2 | 101.2 | 101 | 101.5 | 101.0 | 100.00 | 99.5 | 99.3 | 101.8 | 99.1 | 101.8 |
| Compression[*13] | 101 | 92 | 98 | 105 | 95 | 103 | 93 | 98 | 93 | 90 | 100 | 70 | 118 |

TABLE 9-continued

|  | Examples | | | | | | | Comparison examples | | | | | |
| --- | --- | --- | --- | --- | --- | --- | --- | --- | --- | --- | --- | --- | --- |
|  | 14 | 15 | 16 | 17 | 18 | 19 | 20 | 10 | 11 | 12 | 13 | 14 | 15 |
| Index of spin[*14] | 118.0 | 108.3 | 118.5 | 124.7 | 118.1 | 109.6 | 123.8 | 100 | 107.0 | 110.2 | 100.4 | 99.3 | 125.1 |
| Shot feeling at the time of the shot spin[*15] | Good | Good | Good | Good | Good | Good | Good | Good | Good | Good | Bad Somewhat hard | Bad Somewhat soft | Bad Somewhat hard |

Notes)
[*1]Polybutadiene rubber commercially available from JSR Corporation (containing 97% of cis-1,4-structure).
[*2]Zinc diacrylate, average particle size measured by the particle size distribution analysis (using a centrifugal settlement system): 0.8 μm.
[*3]Zinc diacrylate, average particle size measured by the particle size distribution analysis (using a centrifugal settlement system): 2.5 μm.
[*4]Zinc diacrylate, average particle size measured by the particle size distribution analysis (using a centrifugal settlement system): 4.0 μm.
[*5]Zinc diacrylate, average particle size measured by the particle size distribution analysis (using a centrifugal settlement system): 5.3 μm.
[*6]BHT Swanox, trade name, Seiko Chemical Co., Ltd.
[*7]A relative value to comparison example 1 that is assumed as 100, indicating the ratio of the initial speed of the core to the head speed when a swing robot was used so as to shoot the golf ball at a head speed of 43 m/sec by the driver (wood #1).
[*8]A force (kgf) required to deform the core by 1/10 inch (2.54 mm) at a compression rate of 10 mm/min.
[*9]Sodium salt of ethylene-methacrylate copolymer, Du pont-Mitsui Polychemical Co., Ltd., Shore D hardness: 67.
[*10]Zinc salt of ethylene-methacrylate copolymer, Du pont-Mitsui Polychemical Co., Ltd., Shore D hardness: 66.
[*11]Sodium salt of ethylene-methacrylate-methacrylate ester terpolymer, Du pont Co., Ltd., Shore D hardness: 28.
[*12]A relative value to comparison example 10 that is assumed as 100, indicating the ratio of the initial speed of the golf ball to the head speed when a swing robot was used so as to shoot the golf ball at a head speed of 43 m/sec by the driver (wood club #1).
[*13]A force (kgf) required to deform the golf ball by 1/10 inch (2.54 mm) at the compression rate of 10 mm/min.
[*14]A relative value to comparison example 10 that is assumed as 100, indicating a rate of back spin (rpm) when the golf ball is shot at a head speed of 33 m/sec by the pitching wedge.
[*15]The shot feeling when a professional golfer shoots the golf ball by the driver (wood club #1).

As can be seen from Table 9, examples 14 to 20 of the golf ball of the present invention have the adequate compression and are superior in the impact resilience (flying performance), shot feeling and spin performance, as compared to the comparison example 10 equivalent to the conventional two piece golf ball. On the other hand, in comparison example 11, namely, when the rubber composition containing zinc diacrylate of the average particle size of 5 μm or more (5.3 μm) is covered with the resin composition of the present invention wherein the diene rubber is dispersed in the ionomer resin, the impact resilience of the core properties is bad and thus the ball properties deteriorate. In the comparison example 12, namely, when soft resin of Shore D hardness of 28, instead of the diene rubber, is blended in the rubber composition of the present invention containing zinc diacrylate of the average particle size of 5 μm or less (2.5 μm), core properties are good while the spin performance of the ball properties is good but the impact resilience thereof is bad. In comparison example 13, namely, when the rubber composition of the present invention containing zinc diacrylate of the average particle size of 5 μm or less is covered with the ionomer resin of Shore D hardness of 65 or more (67), the impact resilience is considerably high, but the shot feeling is bad. In comparison examples 14 and 15, namely, when zinc diacrylate of the average particle size of 5 μm or less (2.5 μm) is blended less than and more than the present invention respectively, the respective shot feelings are bad.

As described above, according to the present invention, the core is constituted of the rubber composition which is compounded of 100 parts by weight of matrix rubber containing polybutadiene rubber having 40% or more of cis-1,4-structure and 20 to 40 parts by weight of unsaturated carboxylic acid metal salt having the average particle size of 5.0 μm or less. The cover is also constituted of the resin composition which contains the ionomer resin and the diene rubber dispersed in the ionomer resin and which has Shore D hardness of 65 or less, preferably 62 or less. Thus, it is possible to provide a solid golf ball having superior flying performance (impact resilience), shot feeling and spin performance. For instance, the flying performance is superior for the driver shot, the back spin is easily given to the ball for the iron shot and the shot feeling is also good.

(4) A golf ball cover material composition of the present invention is characterized by that the composition is composed of 50 to 90 parts by weight of ionomer resin, 10 to 50 parts by weight of diene rubber and 0.1 to 5 parts by weight of non-staining antioxidant, the diene rubber is dispersed in the ionomer resin, and the dispersed diene rubber has a particle diameter of 5.0 μm or less.

This ionomer resin has Shore D hardness equal to or more than 55 and less than 80 (55≦Shore D hardness<80). Shore D hardness is set to 55 or more, because the harder ionomer resin has the higher impact resilience. If Shore D hardness is 80 or more, even the mixing of the diene rubber in the ionomer resin has no effect and, as a result, the shot feeling of the obtained golf ball becomes too hard.

The non-staining antioxidant is phenol antioxidant and phosphite antioxidant, for example. Commercially available phenol antioxidant may be used, more particularly, styrenated phenol (SP), 2,6-di-t-butyl-4-methylphenol (DTBMP), 2,2'-methylene-bis(4-methyl-6-t-butylphenol) (MBMTB), 4,4'-thiobis(3-methyl-6-t-butylphenol) (TBMTBP), tetrakis [methylene-3(3,5-di-t-butyl-4-hydroxyphenyl)propionate]methane, and 2-[1-(2-hydroxy-3,5-di-t-pentylphenyl)ethyl]4,6-di-t-pentylphenylacrylate may be used. Commercially available phosphite antioxidant may be used, more particularly, trinonylphenyl phosphite, tris(2,4-di-t-butylphenyl)phosphite, tetrakis(2,4-di-t-butylphenyl)-4,4-biphenylenephosphite, and di(2,4-di-t-butylphenyl)pentaerythritoldiphosphite. Besides, thioether antioxidant may be used.

Preferably, the cover material composition constituting the cover is composed of 50 to 90 parts by weight of the ionomer resin, 10 to 50 parts by weight of the diene rubber and 0.1 to 5 parts by weight of the non-staining antioxidant. If the content of the ionomer resin is less than 50 parts by weight, the hardness of the cover is reduced and thus the shot feeling becomes too soft. On the other hand, if the content of the ionomer resin exceeds 90 parts by weight, the softening by the diene rubber is insufficient and thus the shot feeling becomes too hard. If the content of the non-staining antioxidant is less than 0.1 parts by weight, the amount of non-staining antioxidant is too less, resulting in no effect on the prevention of a change in the color of the cover. If the content exceeds 5 parts by weight, the amount of non-staining antioxidant is too high and, as a consequence, the kneading processability of the cover material composition becomes worse.

In this composition, the diene rubber is dispersed in the ionomer resin. The particle diameter of the diene rubber is 5 μm or less, or preferably 0.1 to 5 μm. By using particle diameter as fine as 5 μm or less, good impact resilience, durability and appearance can be obtained. Preferably, the diene rubber is thermally crosslinked in this composition.

The hardness of the cover material composition, that is, the hardness of the cover of the golf ball is Shore D hardness of 62 or less, or preferably 45 to 62. If the hardness exceeds Shore D hardness of 62, the cover becomes too hard and thus the shot feeling becomes worse.

For manufacturing the above-mentioned composition constituting the cover, 50 to 90 parts by weight of the ionomer resin, 10 to 50 parts by weight of the diene rubber and 0.1 to 5 parts by weight of the non-staining antioxidant are kneaded at the melting temperature of the ionomer resin, i.e. between 130 to 260° C., preferably 150 to 260° C., with the air shut out. The air is shut out, because the cover changes its color (colored in yellow) if the air is not shut out. For shutting out the air during kneading, all the materials are introduced through an initial material inlet of a kneading extruder and no material is introduced through the subsequent inlets (the subsequent inputs are closed). Also, for manufacturing the above-described composition, at the ratio of viscosity of the ionomer resin at the mixing temperature of the ionomer resin to viscosity of the diene rubber at the same temperature (the diene rubber/the ionomer resin) ranging from 1/1 to 5/1, 50 to 90 parts by weight of the ionomer resin is mixed with 10 to 50 parts by weight of the diene rubber at the melting temperature of the ionomer resin (130 to 260° C.). Thereby, the diene rubber can be dispersed in the ionomer resin in such a manner that it has the particle diameter of 5 μm or less.

If the viscosity ratio is higher than 5/1, the difference in viscosity between the ionomer resin and the diene rubber is larger. As a result, since the shearing force is not applied during the kneading, the diene rubber is not finely dispersed. On the other hand, if the viscosity ratio is lower than 1/1, the viscosity of the ionomer resin is higher than that of the diene rubber. As a consequence, since the composition is structured so that the ionomer resin is finely dispersed in the diene rubber in a converse manner, the ionomer resin and the diene rubber cannot be mixed. Preferably, the kneading is carried out at the shear rate of 1000/sec or more. If the shear rate is less than 1000/sec, the diene rubber cannot have the particle diameter of 5 μm or less. Preferably, a twin-screw extruder is used as a mixer for use in this kneading.

EXAMPLES

Comparison Examples

The cover materials, having the blend contents (parts by weight) shown in the upper rows in Tables 10 and 11, were introduced into a golf ball molding equipment. Then, the spherical solid core of 38.3 mm diameter was covered with a cover having a thickness of 2.3 mm, whereby two piece golf balls of two layer structure were manufactured (examples 21 to 27, comparison examples 16 to 22). Physical properties of these golf balls are shown in the lower rows in Tables 10 and 11.

TABLE 10

|  | Examples | | | | | | |
|---|---|---|---|---|---|---|---|
|  | 21 | 22 | 23 | 24 | 25 | 26 | 27 |
| subsequent inputs | Closed | Closed | Closed | Closed | Closed | Closed | Closed |
| Himilan 1605[*1] | 45 | 40 | 35 | 30 | 40 | 35 | 35 |
| Himilan 1706[*2] | 45 | 40 | 35 | 30 | 40 | 35 | 35 |
| Nipol 1220L[*3] | 10 | 20 | 30 | 40 |  | 30 | 30 |
| Nipol NS-218[*4] |  |  |  |  | 20 |  |  |
| Titanium dioxide | 1 | 1 | 1 | 1 | 1 | 1 | 1 |
| Antioxidant A[*5] | 1 | 1 | 1 | 1 | 1 |  | 0.5 |
| Antioxidant B[*6] |  |  |  |  |  | 1 |  |
| Antioxidant C[*7] |  |  |  |  |  |  | 0.5 |
| Rubber crosslinked or not[*8] | ◯ | ◯ | ◯ | ◯ | ◯ | ◯ | ◯ |
| Rubber particle diameter (μm)[*9] | 1 | 2 | 3 | 4 | 3 | 3 | 3 |
| Cover material hardness[*10] | 60 | 56 | 53 | 50 | 58 | 53 | 53 |
| Index of impact resilience[*11] | 101.4 | 100.9 | 100.7 | 100.0 | 100.5 | 100.8 | 100.6 |
| Index of durability[*12] | 95 | 100 | 105 | 115 | 95 | 105 | 105 |
| Shot feeling[*13] | Δ | ◯ | ◯ | ▽ | ◯ | ◯ | ◯ |
| Appearance[*14] | ◯ | ◯ | ◯ | ◯ | ◯ | ◯ | ◯ |
| Colored or not[*15] | ◯ | ◯ | ◯ | ◯ | ◯ | ◯ | ◯ |
| Colored or not[*16] | ◯ | ◯ | ◯ | ◯ | ◯ | ◯ | ◯ |

TABLE 11

|  | Examples | | | | | | |
|---|---|---|---|---|---|---|---|
|  | 16 | 17 | 18 | 19 | 20 | 21 | 22 |
| Subsequent inputs | Closed | Closed | Closed | Closed | Closed | Closed | Closed |
| Himilan 1605[*1] | 35 | 35 | 35 | 35 | 45 | 20 | 35 |
| Himilan 1706[*2] | 35 | 35 | 35 | 35 | 40 | 20 | 35 |
| Nipol 1220L[*3] |  | 30 | 30 | 30 | 5 | 60 | 30 |
| Himilan AM7316[*17] | 30 |  |  |  |  |  |  |
| Titanium dioxide | 1 | 1 | 1 | 1 | 1 | 1 | 1 |
| Antioxidant A[*5] |  |  | 10 | 1 | 1 | 1 |  |
| Antioxidant D[*18] |  |  |  |  |  |  | 1 |
| Rubber crosslinked or not[*8] |  | ○ | X | ○ | ○ | ○ | ○ |
| Rubber particle diameter ($\mu$m)[*9] |  | 3 | 3 | 3 | 1 | 6 | 3 |
| Cover material hardness[*10] | 60 | 53 | 52 | 52 | 65 | 43 | 55 |
| Index of impact resilience[*11] | 100.0 | 100.8 | 98.2 | 100.5 | 102.5 | 100.0 | 100.9 |
| Index of durability[*12] | 100 | 105 | 110 | 100 | 90 | 150 | 100 |
| Shot feeling[*13] | ○ | ○ | ○ | ○ | ▲ | ▼ | ○ |
| Appearance[*14] | ○ | ○ | X | ○ | ○ | ○ | ○ |
| Colored or not[*15] | ○ | ○ | ○ | X | ○ | ○ | X |
| Colored or not[*16] | ○ | X | ○ | — | ○ | ○ | — |

Notes)
[*1]Sodium salt of ethylene-methacrylic acid copolymer, Du pont-Mitsui Polychemical Co., Ltd., Shore D hardness: 67.
[*2]Zinc salt of ethylene-methacrylic acid copolymer, Du pont-Mitsui Polychemical Co., Ltd., Shore D hardness: 66.
[*3]Polybutadiene rubber, Nippon Zeon Co., Ltd., containing 97% of 1,4-cis-structure, Mooney viscosity: 44.
[*4]Styrene-butadiene rubber, Nippon Zeon Co., Ltd., Mooney viscosity: 45.
[*5]Irganox 1010 (phenol antioxidant).
[*6]Sumilizer GS (phenol antioxidant).
[*7]Adekastab PEP-24G (phosphite antioxidant).
[*8]A toluene extraction test is carried out to judge whether or not the diene rubber is crosslinked depending on whether or not the diene rubber is extracted. ○ means the rubber is crosslinked. X means the rubber is not crosslinked.
[*9]An average particle diameter of 10 particles selected in order of bigger size of particles diameters obtained by performing an image analysis of 100 arbitrary diene rubber particles during observing by a transmission electron microscope.
[*10]A 2-mm-thick injection-molded resin plate was cured at 23° C. for twenty days, three resin plates were then stacked and measured at 23° C. by the use of the Shore D durometer.
[*11]A relative value to comparison example 16 that is assumed as 100, indicating the ratio of the initial speed of the golf ball to the head speed when a swing robot was used so as to shoot the golf ball at a head speed of 43 m/sec by the driver (wood #1).
[*12]A relative value to comparison example 16 that is assumed as 100, indicating how many times the golf ball was shot before a crack is caused when a swing robot was used so as to shoot the golf ball at a head speed of 43 m/sec by the driver (wood #1).
[*13]The shot feeling when the professional golfer shoots the golf ball by the driver (wood club #1). ○ means soft shot feeling. Δ means somewhat hard but soft shot feeling. ∇ means somewhat soft but soft shot feeling. ▲ means too hard shot feeling. ▼ means too soft shot feeling.
[*14]A visual check on the painted ball surface. X means the golf ball can not be sold in the market due to the fluffy surface. ○ means a good appearance.
[*15]Color during mixing. X means the cover has changed its color to the color of the crosslinking agent. ○ means the cover has not changed its color.
[*16]Color during molding the cover. X means the cover has changed its color. ○ means the cover has not changed its color.
[*17]Zinc salt of ethylene-methacrylic acid-methacrylate terpolymer, Du pont-Mitsui Polychemical Co., Ltd., Shore D hardness: 34.
[*18]Nocrac AW (amine antioxidant).

In Table 11, there are shown the following cases. In comparison example 16, the diene rubber is not used. In comparison example 17, the antioxidant is not used. In comparison example 18, the diene rubber is used but it is not crosslinked. In comparison example 19, the subsequent inlets of the golf ball molding equipment are opened (the kneading is not carried out with the air shut out). In comparison example 20, the hardness of the cover material is too high. In comparison example 21, the hardness of the cover material is too low and the particle diameter of the diene rubber is too large. In comparison example 22, the amine antioxidant differing from the non-staining antioxidant is used as the antioxidant.

As can be seen from Tables 10 and 11, golf ball of the present invention (examples 21 to 27) has a better appearance because of no change in the color of the cover, softer shot feeling and superior durability and impact resilience, as compared to comparison examples 16 to 22.

As described above, according to the present invention, the golf ball cover material composition is composed of 50 to 90 parts by weight of the ionomer resin, 10 to 50 parts by weight of the diene rubber and 0.1 to 5 parts by weight of the non-staining antioxidant, the diene rubber is dispersed in the ionomer resin, and the dispersed diene rubber has the particle diameter of 5.0 $\mu$m or less. Thus, it is possible to provide a golf ball in which the color of the golf ball does not change and has a softer shot feeling and superior durability and impact resilience.

(5) In a method of manufacturing a golf ball cover material composition constituted by kneading ionomer resin and diene rubber and dispersing the diene rubber in the ionomer resin, the present invention is characterized by any of (a), (b) and (c) described below.

(a) According to the present invention, in the first place, the ionomer resin and the diene rubber are previously mixed, at a weight ratio (ionomer resin/diene rubber) ranging from 9/1 to 5/5, at such a temperature at which the diene rubber is not crosslinked (hereinafter, referred to as a first step).

The ionomer resin has Shore D hardness equal to or more than 55 and less than 80 (55≦Shore D hardness<80). Shore D hardness is set to 55 or more, because the harder ionomer resin has the higher impact resilience. If Shore D hardness is 80 or more, even the mixing of the diene rubber in the ionomer resin has no effect and, as a result, the shot feeling of the obtained golf ball becomes too hard.

If the weight ratio (ionomer resin/diene rubber) exceeds 9/1, the amount of diene rubber is too small and thus the diene rubber softens the cover material insufficiently. If this cover material is used for the golf ball, shot feeling becomes too hard. On the other hand, if the weight ratio (ionomer resin/diene rubber) is less then 5/5, the amount of ionomer resin is too small and thus the hardness of the cover material is reduced. Therefore, when this cover material is used for the golf ball, the shot feeling becomes too soft.

The previous mixing at the non-crosslinking temperature may be performed by a batch mixer at the temperature of 100° C. or more and less than 150° C. The batch mixer used herein is an internal mixer such as a Brabender mixer, a Banbury mixer and a kneader.

Next, according to the present invention, the mixture of the ionomer resin and the diene rubber resulting from the first step is kneaded at such a temperature that the diene rubber is crosslinked (hereinafter, referred to as a second step). This kneading may be performed by the twin-screw extruder at the temperature of 150° C. or more and less than 260° C.

As the crosslinking agent for crosslinking the diene rubber, the typical one such as sulfur and organic peroxide can be used. However, preferably, the diene rubber is thermally crosslinked.

Through the second step, the cover material composition can be obtained, in this composition, the crosslinked diene rubber is dispersed in the ionomer resin. The particle diameter of the diene rubber is 5 μm or less, or preferably 0.1 to 5 μm. By using the particle diameter as fine as 5 μm or less, good impact resilience, durability and appearance can be obtained. In order that the particle diameter of the diene rubber is 5 μm or less, the kneading may be carried out at the shear rate of 1000/sec or more in the second step.

(b) On the other hand, when the ionomer resin and the diene rubber are kneaded, for convenience of kneading, the ionomer resin is pelletized, the uncured diene rubber is pelletized and then these pellets are mixed. Pelletized ionomer resin has good storage stability because the ionomer resin is thermoplastic resin and thus is in a solid state at a room temperature (about 20° C.), but the pellets of the diene rubber are disadvantageously prone to blocking because the uncured diene rubber has a high tack and thus is sticky. For this reason, since the uncured diene rubber must be pelletized just before kneading the ionomer resin and the diene rubber (the pellet surface is sprinkled with talc in order to prevent the blocking, as needed), a kneading process is complicated.

Therefore, the present invention also includes the case described below. That is, instead of the first step, the uncured diene rubber is pelletized, these pellets and ionomer resin powder are mixed in order to prevent the blocking, the pellets of the diene rubber sprinkled with the ionomer resin powder on the surface thereof is made, and then these pellets and the pellets of the ionomer resin are mixed. For constituting the pellets of the diene rubber whose surface is sprinkled with the ionomer resin powder, the ionomer resin powder obtained by powdering a part of the used ionomer resin pellet may be mixed with one part by weight of the pelletized diene rubber in an amount which is one part by weight or more of the resin powder and not higher than the blend proportion of the ionomer resin.

In this way, the surface of the pellet of the diene rubber is sprinkled with the ionomer resin powder, whereby the blocking of the diene rubber can be prevented. Thus, the diene rubber can be pelletized before the ionomer resin and the diene rubber are kneaded. Therefore, the pellets of the diene rubber can be previously made and stored, and consequently the process of manufacturing the golf ball cover material composition is more flexible. Additionally, since the use of the talc for preventing the blocking can be eliminated or reduced, it is possible to avoid the dispersion in quality of the obtained golf ball cover material composition due to the use of the talc and to stabilize the quality of the obtained golf ball.

Next, an example of blending is described below when the butadiene rubber (BR) is used as the diene rubber (the blend ratio of BR is equal to 15% by weight of the obtained golf ball cover material composition).

BR pellet 15 kg; the ionomer resin powder 20–30 kg; and the ionomer resin pellet 65 to 55 kg.

The BR pellet covered with the ionomer resin powder obtained by this blending (BR pellet/ionomer resin powder) was allowed to stand on trial in the air for about one month at the room temperature (about 20° C.). In this case, the troublesome blocking of BR did not occur. Furthermore, when the golf ball was molded using the golf ball cover material composition obtained by this blending, the moldability, the static physical properties, the initial speed efficiency and the flying performance of the golf ball had no problem (these properties were equivalent to the properties of the conventional golf ball). The crack durability was equivalent or superior to the crack durability of the conventional golf ball.

(c) According to the present invention, instead of the first step, the pellets of the mixture of the ionomer resin powder and the diene rubber may be mixed with the pellets of the ionomer resin. This mixture contains 10–40% by weight of the ionomer resin powder.

In such a manner, the pellet of the mixture of the ionomer resin powder and the diene rubber also does not cause the blocking. Therefore, the pellets can be previously made and stored, and consequently the process of manufacturing the golf ball cover material composition can be made more flexible. Examples, comparison examples:

The blends, obtained by the blending of the cover material (blending A, blending B) shown in Table 12, were mixed using a mixer at a mixing temperature as shown in Table 12. Then, the spherical solid core of 38.3 mm diameter was covered with a cover having a thickness of 2.3 mm and having the obtained composition, whereby two piece golf balls of two layer structure were manufactured (examples 28 to 30, comparison examples 23 to 28). The productivity (whether or not the supply of the material composed of the ionomer resin and the diene rubber to the mixer is troubled), impact resilience, durability and appearance of these golf balls were evaluated. This result is shown in the lower rows in Table 12.

TABLE 12

|  |  | Examples ||| Comparison examples |||||||
| --- | --- | --- | --- | --- | --- | --- | --- | --- | --- | --- |
|  |  | 28 | 29 | 30 | 23 | 24 | 25 | 26 | 27 | 28 |
| Blending of cover material |  | A | A | B | A | A | A | A | A | B |
| Mixer | First step | Kneader | Kneader | Kneader | Twin-screw extruder | Kneader | Kneader | Kneader | Kneader | Twin-screw extruder |
|  | Second step | Twin-screw extruder | Twin-screw extruder | Twin-screw extruder |  | Twin-screw extruder | Twin-screw extruder | Twin-screw extruder | Twin-screw extruder |  |
| Mixing temperature | First step | 130 | 130 | 180 | 180 | 160 | 200 | 120 | 130 | 180 |
| (° C.) | Second step | 180 | 200 | 180 |  | 180 | 200 | 270 | 130 |  |
| Introduction of | First step | No | No | No | Detected | Detected | No | No | No | Detected |
| crosslinking agent | Second step | Detected | No | Detected |  | No | No | No | No |  |
| Crosslinking of | First step | No | No | No | Detected | Detected | Detected | No | No | Detected |
| diene rubber[*1] | Second step | Detected | Detected | Detected |  |  |  | Detected | No |  |
| Particle diameter of diene rubber[*2] |  | 2 | 2 | 3 | 3 | 11 | 9 | 2 | 3 | 4 |
| Trouble with supply of material |  | No | No | No | Detected | No | No | No | No | Detected |
| Index of impact resilience[*3] |  | 100.3 | 100.7 | 99.8 | 100 | 99.4 | 99.6 | 99.5 | 98.0 | 99.5 |
| Index of durability[*4] |  | 105 | 110 | 95 | 100 | 70 | 85 | 85 | 105 | 90 |
| Appearance[*5] |  | ○ | ○ | ○ | ○ | X | X | X | X | ○ |

Blending A: Himilan 1605 [*6]/Nipol 1220L [*7]/Titanium dioxide = 70/30/1 (parts by weight)
Blending B: Himilan 1605/Nipol NS-218 [*8]/Titanium dioxide = 70/30/1 (parts by weight)
Crosslinking agent: Vulcanizer master batch composed of Sulfur/NoccelerCZ/ZnO/Stearic acid = 1.5/1.5/3.0/2.0 (parts by weight)
Notes)
[*1]The toluene extraction test is carried out to judge whether or not the diene rubber is crosslinked depending on whether or not the diene rubber is extracted.
[*2]An average particle diameter of 10 particles selected in order of bigger size of particles diameters obtained by performing the image analysis of 100 arbitrary diene rubber particles during observing by the transmission electron microscope.
[*3]A relative value to comparison example 23 that is assumed as 100, indicating the ratio of the initial speed of the golf ball to the head speed when a swing robot was used so as to shoot the golf ball at a head speed of 43 m/sec by the driver (wood #1).
[*4]A relative value to comparison example 23 that is assumed as 100, indicating how many times the golf ball was shot before the crack is caused when a swing robot was used so as to shoot the golf ball at a head speed of 43 m/sec by the driver (wood #1).
[*5]The visual check on the painted ball surface. X means that the golf balls can not be sold in the market due to the fluffy surface. ○ means a good appearance.
[*6]Sodium salt of ethylene-methacrylic acid copolymer, Du pont-Mitsui Polychemical Co., Ltd., Shore D hardness: 67.
[*7]Polybutadiene rubber, Nippon Zeon Co., Ltd., containing 97% of 1,4-cis-structure, Mooney viscosity: 44.
[*8]Styrene-butadiene rubber, Nippon Zeon Co., Ltd., Mooney viscosity: 45.

As can be seen from Table 12, the golf ball of the present invention (examples 28 to 30) is superior to comparison examples 23 to 28 in the productivity (no trouble with the material supply), impact resilience, durability and appearance. Comparison example 23 is superior in the impact resilience, the durability and the appearance but inferior in the productivity. Comparison examples 24 to 26 are superior in productivity but inferior in durability and appearance. Comparison example 27 is superior in the productivity but inferior in the appearance. Comparison example 28 is inferior in the productivity.

As described above, according to the present invention, because of (a), (b) or (c) described below, it is possible to obtain the golf ball having superior productivity, superior impact resilience, superior durability and good appearance. That is, (a) the ionomer resin and the diene rubber are previously mixed, at the weight ratio (ionomer resin/diene rubber) ranging from 9/1 to 5/5, at such a temperature at which the diene rubber is not crosslinked, and then the resultant mixture is kneaded at such a temperature at which the diene rubber is crosslinked, whereby the golf ball cover material composition is manufactured; (b) the pellets of the diene rubber whose surface is sprinkled with the ionomer resin powder is mixed with the pellets of the ionomer resin, and then the resultant mixture is kneaded at such a temperature that the diene rubber is crosslinked; or (c) the pellets of the mixture of the ionomer resin powder and the diene rubber is mixed with the pellets of the ionomer resin, and then the resultant mixture is kneaded at such a temperature that the diene rubber is crosslinked.

(6) Also, in the golf ball having a core applied with an outer cover according to the present invention, the cover has a Shore D hardness (A) of 63 or below and the golf ball has a compression value (B), and the Shore D hardness (A) of the cover has a ratio to the compression value (B) of the golf ball, (A)/ (B), within a range of 0.49 to 0.6. The core may comprise a single-layer one or may have a multi-layer structure comprising two or more layers, and same as this applies also to the cover.

The hardness of the cover is 63 or below or, more preferably, within a range of 45 to 62 in terms of the Shore D hardness. If the cover has a hardness greater than 63 of the Shore D hardness, the golf ball tends to give a harsh or unpleasantly hard feeling when it is hit and the control performance of characteristic of the ball tends to lower.

The ratio, (A)/(B), of the Shore D hardness (A) of the cover to the compression value (B) of the golf ball, is within a range of 0.49 to 0.6. Where the ratio (A)/(B) is smaller than 0.49, the feeling golfers may obtain in hitting the ball tends to be unpleasantly hard and the ball is likely to be poor in the feeling, and where it is greater than 0.6, the ball tends to lower the initial speed when it is hit and to be relatively poor with respect to the flying performance (impact resilience) and the control characteristic.

Preferably the thickness of the cover is within a range of 2.0 to 2.4 mm. This is because if the cover has a thickness smaller than 2.0 mm, it tends to have a poor durability, and if it has a thickness greater than 2.4 mm, then the impact resilience of the golf ball tends to lower.

Then, in connection with the material for use for the cover according to the present invention, no particular limitation is applied thereto, and any material may be useful insofar as it can exhibit a Shore D hardness of 63 or less as earlier stated. Useful for the material for the cover are, for example, ionomer resins, either singly or in a blend of two or more, and a thermoplastic elastomer composition containing an ionomer resin and a diene rubber as earlier pointed out. Particularly, it is desirable to use a thermoplastic elastomer composition containing an ionomer resin and a diene rubber in that while such composition has a Shore D hardness which is relatively limited, it can exhibit remarkable impact resilience and durability. In connection with ionomer compositions, then, it is desirable to use such ones among others which has a Shore D hardness of 55 or above but smaller than 80 in that it is then possible to obtain a remarkable impact resilience and, when a diene rubber is blended in the resin, obtain a suitable hardness.

In connection with the compounding ratios of the ionomer resin and the diene rubber in thermoplastic elastomer compositions for use for the cover, preferably the diene rubber is in an amount of 10 to 50 parts by weight, while the ionomer resin is in an amount of 50 to 90 parts by weight. Where the ionomer resin is in an amount less than 50 parts by weight, the hardness of the cover material tends to be lower and the resulting golf ball tends to give too soft a feeling when it is hit, while if the ionomer resin amount exceeds 90 parts by weight, the effect of softening due to incorporation of the diene rubber tends to be insufficient and the resulting golf ball tends to give too hard a feeling when it is hit.

Further, the cover material may contain in addition to the ionomer resin and the diene rubber, such as white pigment, dye, UV absorbent, antioxidant, a dispersion adjuvant such as metal soap, stabilizer, lubricant and coloring agent, which may be suitably blended in the cover material as needs be. For the white pigment, named can be, for example, titanium oxide, zinc oxide, calcium carbonate, white lead, zinc sulfide, barium sulfide, gypsum and precipitated silica.

Where a thermoplastic elastomer composition as described above is used for the cover material in the golf ball according to the present invention, it may be carried out to a melt-knead each of the ionomer resin, the diene rubber and other ingredients which may be used as needs be, by, for example, a twin-screw kneader/extruder, have the diene rubber dispersed in continuous phase comprising the ionomer resin, and while kneading is continuously performed, add a vulcanizing agent into the mixture being kneaded, and cause the diene rubber to be dynamically vulcanized through kneading, to thereby prepare a material for the cover.

For the vulcanizing agent, no particular limitation is applicable, and use may be made of any of vulcanizing agent for rubber which are generally put to use, which include, for example, sulphur-based vulcanizing agents, organic peroxide vulcanizing agents, phenol resin-based vulcanizing agents, and zinc white. Such as a vulcanization accelerator and a vulcanization accelerating adjuvant, too, may be made use of suitably. Also, as earlier described, crosslinking (vulcanization) may be effected only through heating without using a crosslinking agent.

Preferably, the diene rubber to be dispersed in a continuous phase comprising an ionomer mesh pursuant to the present invention is in the form of a particle having a particle diameter on the order of 5μm or below.

The golf ball according to the present invention is formed on the outer surface of the cover with concavities, generally called dimples, for imparting to the ball a suitable tendency to rotate and also for reducing air resistance when the ball flies. The geometrical arrangement of dimples may be any of such as an octahedron arrangement and an icosahedron arrangement, and the pattern of dimple arrangement may be any of such as a square type one, a hexagon type one, a pentagon type one and a triangle type one. Further, the outer surface of the cover may be processed with various treatments such as buff polishing, painting and stamping.

The cover-applied core in/of the golf ball according to the present invention is composed of a rubber composition containing a base rubber and a crosslinking agent and further such as a reinforcing agent and a polymerization initiator.

For the base rubber, the main component of the rubber composition for the core, generally the use is made of a rubber mainly comprising polybutadiene and particularly, a rubber containing polybutadiene having 40% or more or, preferably, 90% or more, of cis-1,4-structure.

For the base rubber, further use may be made singly of the above rubber mainly comprising polybutadiene or a co-use may be made of a further rubber ingredient as needs be, and for the further rubber ingredient, there may be named, for example, natural rubber, polyisoprene rubber, styrene-butadiene copolymer rubber and ethyl-propylene-diene ter-polymer rubber (EPDM).

For the crosslinking agent to be used for the rubber composition for the core, use may be made of such as α, β-ethylene-unsaturated carboxylic acids or metal salts thereof, bismaleimide compounds and urethane(metha) acrylates.

For the α, β-ethylene-unsaturated carboxylic acids useful for the crosslinking agent, there may be name such as acrylic acids and methacrylic acids, and the metal salts thereof include such as zinc acrylates and zinc methacrylates; particularly, zinc acrylates are desirably used in view of the possibility to attain remarkable impact resilience and durability. A material example of zinc acrylates is the zinc diacrylate marketed under the tradename RT by SARTOMER, U.S.A.

Bismaleimide compounds used for the crosslinking agent include for example such as N,N'-ethylenebismaleimide, N,N'-trimethylenebismaleimide, N,N'-m-phenylenebismaleimide, N,N'-4, 4'diphenylmethanebismaleimide, N,N'-4,4'-diphenyletherbismaleimide, N,N'-4,4'-diphenylsulfonbismaleimide.

For the above urethane(metha)acrylates, use may be made of, for example, such as diisocyanates; (metha)acrylate group-containing urethane compounds obtainable by reacting an isocyanate prepolymer with a hydroxyl group-containing di- or poly(metha)acrylate; urethane acrylates obtainable by reacting glycol or polyol with diisocyanate to form an aduct containing isocyanate group, followed by reacting the formed aduct with the above hydroxyl group-containing di- or poly(metha)acrylate; and urethane acrylates obtainable by reacting polyol with isocyanate to form diisocyanate group terminated prepolymer followed by reacting this prepolymer with hydroxyl group-containing di- or poly(metha)acrylate.

The above isocyanate prepolymers are prepolymers having terminal isocyanate group obtainable by reacting di- or polyisocyanate with polyols such as glycol, triols, tetraols or polyetherpolyols such as polyetherdiol having a molecular weight of 2000 or less, polyethertriol, polycaptolactonetherdiol, polycaprolacontriol.

The di- or poly(metha)acrylates having hydroxyl group can easily react with isocyanates to form urethane acrylates and include such as compounds obtainable by reacting acrylic acid, methacrylic acid or derivatives thereof with polyhydric alcohol; and reacting acrylic acid, methacrylic acid or derivatives thereof with polyhydric alcohol; and compounds obtainable by reacting acrylic acid, methacrylic acid or derivatives thereof with an epoxy radical-containing compound.

The content ratios of the crosslinking agent in the rubber composition for the core are normally on the order of 15 to 40 parts by weight per 100 parts by weight of the base rubber. If the content ratio of crosslinking agent is less than 15 parts by weight, the rubber composition tends to be so soft that the impact resilience cannot be sufficiently high, while it tends to be so hard that the feeling upon shooting is lowered if the content ratio is greater than 40 parts by weight.

Further, reinforcing agents which may be used where necessary as a component of the rubber composition for the core are for example silicon dioxides and metal oxides.

Useful silicon dioxides have a specific surface area according to BET measuring method of 160 to m/g and a purity of 99% or above. Material examples of the silicon dioxides are such ones as being marketed under the tradenames of AEROSIL 200, AEROSIL 200V, AEROSOL 300, REOLOSIL QS-102 by Nippon Aerosil K.K.

The metal oxides are, for example, zinc oxides, barium sulfate and calcium carbonate.

The polymerization initiators include, for example, organic peroxides such as dicumyl peroxide, t-butyl peroxy benzoate, d-t-butyl peroxide and 1,1-bis(t-butyl peroxy)-3,3,5-trimethylcyclohexane.

The polymerization intiator may be blended normally in a ratio of 1 to 5 parts by weight per 100 parts by weight of the base rubber.

The diameter of the core in the golf balls according to the present invention is normally 37.50 to 40.00 mm. and to take into consideration the thickness of the cover (ball diameter−core diameter)/2] in order to attain a ball diameter which satisfies the R & A Rules, preferably the core diameter is 38.00 to 40.00 mm. If the core diameter is smaller than 38.00 mm, the thickness of the cover tends to be too large, and an increase in the thickness of the cover tends to accompany lowering of the impact resilience of the ball. If the core diameter is larger than 40.00 mm, the thickness of the cover tends to be reduced to lower the durability such as resistance to ball surface damage and/or cut in the cover.

With the golf balls according to the present invention, the 2.54 compression values (B) of the balls are normally 75 to 140 kgf, and preferably, 90 to 130 kgf in order to attain a desirable feeling upon ball hitting. If the 2.54 compression value (B) does not reach 75 kgf, the ball tends to be so soft that when it is hit, it gives an unpleasant feeling such that the ball tends to not easily leave the club. If this value (B) exceeds 140 kgf contrary to the above, then a soft feeling cannot be obtained, and the feeling tends to be hard and impart such an unpleasant feeling as causing a paralysis in arms.

In the manufacture of golf balls according to the present invention, first a rubber composition for the core is prepared by mixing altogether the above described base rubber, crosslinking agent, reinforcing agent, polymerization initiator and so forth, and after the resulting rubber composition is homogeneously kneaded in a customary manner, the kneaded product is supplied into the prescribed mold, and a core material is formed according to the method in which heating and vulcanization is carried out under pressure toe effect integral molding.

Then, a cover is produced. For example where use is made of the above described thermoplastic elastomer composition, the above described monomer resin, diene rubber and other ingredients which may be used as needs be, are melt kneaded by a twin-screw kneader/extruder, and by having the diene rubber dispersed in a continuous phase comprising the ionomer resin and having the diene rubber dynamically vulcanized during the kneading, a thermoplastic elastomer composition is prepared, which may be melt kneaded and applied to cover the outer peripheral surface of the above prepared core material, whereby a golf ball is produced. Covering of a core material with a cover material can be made by disposing a core material in the prescribed injection molding die and applying a melt cover material by injection molding.

Golf balls according to the present invention are structured as described above and have a diameter of 42.67 mm or above and a weight of 45.93 g or below pursuant to golf ball regulators.

EXAMPLES

Comparison Examples

Now, the present invention will be described in further detail with reference to Examples and Comparison Examples, in which the Shore D hardness of the cover, compression value of the ball, flying performance (impact resilience) and the shot feeling were determined according to the following described methods.

Shore D Hardness (A) of the Cover:

Shore D hardness was determined of the cover material produced in a sheet form according to ASTM D2240. The determination was made five times in repetition and found values were averaged.

Compression Value (B) of the Ball:

Measured was the required force (kgf) for causing the golf ball to undergo 1/10 inch (2.54 mm) deformation at a compression rate of 10 mm/min.

Control Performance:

Stroboscopic photos were taken of the golf ball when it is shot by a pitching wedge at a head speed of 33 m(sec, using a swing robot (Shot Robo, a product of Miyamae K.K.), and a test to find the amount of spin by dividing the angle of rotation of the ball by the emission interval of the stroboscope. The test was carried out five times in repetition and the found values were averaged and put to evaluation based on the following criterion:

O: The spin amount was 9000 rpm or more; and

X: The spin amount was less than 9000 rpm.

Flying Performance:

Tests to find the flying distance (carry) and the point of final reach (run) of the golf ball when the ball was shot by the swing robot (Shot Robo, product of Miyamae K.K.) under the condition that a reference ball was shot at a shooting angle of 12 degrees, a spin amount of 2500 rpm and an initial speed of 71 m/sec. Each test was carried out for five balls and found values were averaged and put to evaluation based on the following criterion:

O: The carry was 220 m or more and the run was 230 m or more; and

X: The carry was less than 220 m and the run was less than 230 m.

Feeling at the time of ball hitting (Shot Feeling);

Using #1 wood clubs and #PW iron clubs, golf balls were hit by professional golfers and experienced amateur golfers, and impressions by feeling were found by questioning, the results of which were put to evaluation based on the following criterion:

O: More than a half of the participant golfers had good feeling for all test items;

Δ: A half of the participant golfers had good feeling for all test terms; and

X: Less than a half of the participant golfers had good feeling for all test terms.

For each of Examples and Comparison Examples later to be described, rubber compositions for the core were prepared according to the formulations (parts by weight) entered in Table 13 below, and with each of the rubber compositions placed in a core forming mold, spherical core materials having a diameter of 38.3 mm were produced.

Also, each of mixtures prepared in the blending particulars shown in Table 14 below was supplied into a twin-screw kneader/extruder, and melt kneading was carried out at 200° C. to provide compositions for the cover material, which were press molded at 180° C. to provide samples in a sheet form having a thickness of 3 mm, of which the Shore D hardness was found. Further, with the above provided core materials used as the core, the core material compositions were applied over the outer peripheral surface of the core materials by injection molding to provide golf balls having a diameter of 42.7 mm. Then, of each of the golf balls, determination or evaluation was conduced in respect of the compression value (B), the flying performance and shot feeling. The results of the determination and the evaluation are entered in Table 15 below:

TABLE 13

|  | core 1 | core 2 | core 3 |
|---|---|---|---|
| JSR BR01*[1] | 100 | 100 | 100 |
| Zn(AA)$_2$*[2] | 24 | 29 | 34 |
| ZnO | 22.0 | 19.7 | 17.3 |
| peroxide*[3] | 3 | 3 | 3 |
| antioxidant*[4] | 0.5 | 0.5 | 0.5 |

Notes:
*[1]polybutadiene rubber, a product of JSR Corporation; 1,4-cis structure: 97%; Mooney viscosity: 42
*[2]zinc acrylate
*[3]dicumyl peroxide
*[4]Irganox 1010, a product of Ciba Geigie

TABLE 14

|  | cover 1 | cover 2 | cover 3 | cover 4 |
|---|---|---|---|---|
| H1605*[5] | 45 | 40 | 20 | 50 |
| H1706*[6] | 45 | 40 | 20 | 50 |
| S8120*[7] |  |  | 60 |  |
| JSR BR01 | 10 | 20 |  |  |
| TiO$_2$ | 2 | 2 | 2 | 2 |
| Shore D Hardness | 60 | 56 | 59 | 67 |

Notes:
*[5]sodium salt of ethylene-methacrylic acid copolymer, a product of Mitsui-Du Pont Polychemical, Shore D hardness: 67
*[6]Zinc salt of ethylene-methacrylic acid copolymer, a product of Mitsui-Du Pont Polychemical, Shore D hardness: 66
*[7]sodium salt of ethylene-methacrylic acid-methacrylate terpolymer, a product of E.I. DuPont de Nemours, Shore D hardness: 47

TABLE 15

|  | Examples | | Comparison Examples | | |
|---|---|---|---|---|---|
|  | 31 | 32 | 29 | 30 | 31 |
| Cover Material | cover 1 | cover 2 | cover 3 | cover 3 | cover 4 |
| Shore D Hardness (A), Cover | 60 | 56 | 59 | 59 | 67 |
| Core Material | core 2 | core 2 | core 2 | core 3 | core 1 |
| Compression Value (B), Golf Ball | 120 | 112 | 95 | 122 | 97 |
| (A)/(B) | 0.50 | 0.50 | 0.62 | 0.48 | 0.69 |
| Control Performance | ○ | ○ | ○ | ○ | X |

TABLE 15-continued

|  | Examples | | Comparison Examples | | |
|---|---|---|---|---|---|
|  | 31 | 32 | 29 | 30 | 31 |
| Flying Performance | ○ | ○ | X | ○ | ○ |
| Feeling on Shooting | ○ | ○ | ○ | X | Δ |

From considering the above Table 15, it is seen as follows:

With the Comparison Example 29, which represents the instance in which the ratio of the Shore D hardness (A) of the cover to the compression value (B) of the golf ball, (A)/(B), is larger than a value with a range defined according to the present invention, although the feeling upon shooting (shot feeling) and the control performance are good, the flying performance (impact resilience) is poor. With the Comparison Example 30, which represents the instance in which the ratio (A)/(B) takes a value smaller than values within the range defined according to the present invention, although the control performance and the flying performance are good, the feeling upon shooting is poor. Further, with the Comparison Example 31, in which the ratio (A)/(B) exceeds the range according to the present invention and the Shore D hardness (A) takes a value exceeding the range (63 or below) according to the present invention, although the flying performance is good, the control performance is poor and the feeling upon shooting is relatively poor.

In clear contrast to the Comparison Examples 29 to 31, each of the Examples 31 and 32 representing the present invention is remarkable with respect to each of the control performance, the flying performance and the feeling upon shooting.

The golf ball according tot he present invention is remarkable with respect to each of the flying performance and the control performance, and in addition, gives a desirable feeling upon shooting or when the ball is hit. Thus, in hitting the golf ball according to the invention by a wood club such as a driver, it is possible to gain a large flying distance (carry) and hit the ball accurately in an intended direction and to an intended ground point. Also, in hitting the ball with an iron club, in addition to that a larger flying distance can be gained, it is further possible that in attempting approach to a hole on a green, the ball can be spun and controlled so that it can stop exactly at an intended point on the green. Further, regardless of the particular club with which the ball is hit such as a wood club, an iron club, a pitching wedge, a sand wedge and a putter, the player can get a desirable feeling upon shooting. Thus, the golf ball according to the present invention can satisfy golfers of a wide variety of experience and skill such as amateur golfers, experienced golfers and professional golfers.

Although the preferred embodiment of the present invention has been described in detail, it should be understood that various changes, substitutions and alternations can be made therein without departing from spirit and scope of the inventions as defined by the appended claims.

What is claimed is:

1. A golf ball having a core covered with a cover, wherein a ratio of a flexural rigidity value of said golf ball to a flexural rigidity value of said core is 1.8 or more and less than 3.0, and a thickness of said cover is 1.7 to 2.6 mm.

2. The golf ball according to claim 1, wherein Young's modulus of elasticity of said cover is 100 to 200 MPa.

3. The golf ball according to claim 1, wherein said cover is composed of a composition, containing ionomer resin and diene rubber, in which the diene rubber is dispersed in the ionomer resin in such a manner that it has a particle diameter of 5 µm or less.

4. A golf ball having a core covered with a cover, wherein a ratio of a compression value of said golf ball to a compression value of said core is 1.2 or more and less than 1.5, and said cover has a Shore D hardness of 62 or less.

5. The golf ball according to claim 4, wherein said cover is composed of a composition, containing (i) 50 to 90 parts by weight of ionomer resin of Shore D hardness of 55 or more and less than 80 and (ii) 10 to 50 parts by weight of diene rubber, in which the diene rubber is dispersed in the ionomer resin in such a manner that it has a particle diameter of 5 µm or less.

6. The golf ball according to claim 5, wherein said diene rubber is thermally crosslinked without the use of crosslinking agent.

7. A golf ball having a core and a cover covering said core, wherein said core is constituted of a rubber composition which is compounded of 100 parts by weight of matrix rubber containing polybutadiene rubber having 40% or more of cis-1,4-structure and 20 to 40 parts by weight of unsaturated carboxylic acid metal salt having an average particle size of 5.0 pm or less, and said cover is constituted of a resin composition which is composed of ionomer resin and diene rubber dispersed in the ionomer resin and which has Shore D hardness of 65 or less.

8. The golf ball according to claim 7, wherein the average particle size of said unsaturated carboxylic acid metal salt is 2.0 to 3.5 µm.

9. The golf ball according to claim 7, wherein said unsaturated carboxylic acid metal salt is zinc diacrylate and/or zinc dimethacrylate.

10. The golf ball according to claim 7, wherein 10 to 30 parts by weight of barium sulfate are further blended with said rubber composition.

11. The golf ball according to claim 7, wherein said diene rubber is thermally crosslinked without the use of crosslinking agent.

12. The golf ball according to claim 7, wherein Shore D hardness of said cover is 45 to 62.

13. A golf ball having a core applied with a cover, wherein the cover has a Shore D hardness (A) of 63 or below and the golf ball has a compression value (B), the Shore D hardness (A) of the cover having a ratio to the compression value (B) of the golf ball, (A)/(B), within a range of 0.49 to 0.6.

14. A golf ball as claimed in claim 13, wherein said cover has a thickness within a range of 2.0 to 2.4 mm.

15. A golf ball as claimed in claim 13, wherein said cover comprises a thermoplastic elastomer composition containing an ionomer resin and a diene rubber.

16. A golf ball as claimed in claim 13, wherein said cover comprises a diene rubber dispersed in a continuous phase comprising an ionomer resin, the diene rubber being thermally crosslinked without the use of a crosslinking agent.

* * * * *